United States Patent [19]

Kobayashi et al.

[11] Patent Number: 4,894,825
[45] Date of Patent: Jan. 16, 1990

[54] FREQUENCY-DIVISION MULTIPLEX BROADBAND MULTIMEDIA NETWORK

[75] Inventors: Hiroshi Kobayashi, Tokyo; Hideaki Haruyama; Kazuyoshi Ozawa, both of Yokohama, all of Japan

[73] Assignee: Kabushiki Kaisha Toshiba, Kawasaki, Japan

[21] Appl. No.: 353,141

[22] Filed: May 15, 1989

Related U.S. Application Data

[63] Continuation of Ser. No. 140,793, Jan. 5, 1988, abandoned.

[30] Foreign Application Priority Data

Jan. 12, 1987 [JP] Japan .................................. 62-3324

[51] Int. Cl.⁴ .......................... H04J 1/00; H04H 1/02
[52] U.S. Cl. ........................................ 370/124; 455/6; 370/73
[58] Field of Search .................. 370/13, 14, 16, 73, 370/124; 455/3, 6; 358/86; 342/825.01; 371/8, 9, 10

[56] References Cited

U.S. PATENT DOCUMENTS

| | | | |
|---|---|---|---|
| 4,160,127 | 7/1979 | Siana et al. | 370/16 |
| 4,398,285 | 8/1983 | Lutz et al. | 370/16 |
| 4,575,842 | 3/1986 | Katz et al. | 370/16 |
| 4,654,843 | 3/1987 | Roza et al. | 370/73 |

OTHER PUBLICATIONS

Pamphlet of Ricoh's "Image Network System", 1987.

*Primary Examiner*—Joseph A. Orsino
*Assistant Examiner*—Frank M. Scutch III
*Attorney, Agent, or Firm*—Oblon, Spivak, McClelland, Maier & Neustadt

[57] ABSTRACT

In the frequency-division multiplex broadband multimedia network of this invention, a plurality of transmission paths are laid out in a matrix, with transmission path switches being arranged at respective lattice points. Each transmission path switch monitors a transmission path current. When a transmission path switch detects that a current has been cut off, a portion where a communication trouble is caused is disconnected from the network, and the switch connects a portion at the downstream side of this tansmission path switch to another adjacent transmission path.

11 Claims, 7 Drawing Sheets

FREQUENCY-DIVISION MULTIPLEX BROADBAND MULTIMEDIA NETWORK

This is a continuation of Ser. No. 140,793, filed 1/5/88, now abandoned.

BACKGROUND OF THE INVENTION

The present invention relates to an information communication network.

Along with development in the information-oriented society, various information communication networks are available. One type of such information communication networks is a bidirectional CATV in which coaxial cable television as a broadcast network is bidirectionally combined with the information communication network, or broadband network. In the CATV, coaxial cables are extended along roads, and various types of video information are supplied to subscribers. The CATV network normally is a broadband network.

The broadband network is a bidirectional transmission path. However, since a signal is frequency-division multiplexed, it flows in one direction. More specifically, an upstream signal sent from a terminal device is returned at a head end, and is transmitted as a downstream signal. Since a signal is returned at the head end, this network is also called a U-shaped bus.

In the conventional CATV network, when some abnormality of a transmission path, e.g., cable disconnection or cable abnormality occurs, information can no longer flow through a transmission path downstream of the abnormal position. In the conventional CATV network, if malicious signal disturbance occurs, it affects the entire system.

Another prior art is a packet network based on the protocol of "Omninet" (Trademark notice of Corvus Corp.) wherein some nodes are constituted in a matrix. In this network, packets are sent from a transmission node to a reception node via a shortest path. If some trouble occurs on a transmission path, another shortest path is selected. A packet routine algorithm in the packet network is based on the "first come first served" means.

SUMMARY OF THE INVENTION

It is an object of the present invention to provide a frequency-division multiplex broadband multimedia network wherein not only a packet signal but also a continuous signal such as a video signal can be transmitted, a trouble on a transmission path can be detected to switch a transmission path, and as a countermeasure against malicious signal disturbance, an occurrence position of the disturbance signal is localized so as to effectively prevent the influence of the disturbance from reflecting over the entire system.

In order to achieve the above object, an information communication network is provided comprising a head end, a plurality of information transmission paths coupled through the head end, a plurality of terminal devices respectively connected to the plurality of information transmission paths, and transmission path switches, at least one transmission path switch being connected to each of the plurality of information transmission paths, and switching between one transmission path corresponding thereto and another information transmission path.

According to the present invention, when an accident such as a cable fire occurs, supply of a transmission path current toward the downstream side from the accident position is stopped. Therefore, a transmission path switch provided at the most upstream position of a transmission path portion at the downstream side of the accident position is operated to switch the transmission path. As a result, the transmission path at the downstream side of the transmission path switch is connected through the transmission path switch to another transmission path which is separated therefrom at a predetermined distance to be parallel thereto.

Therefore, a terminal device connected at the downstream side of the transmission path switch can be subjected to information communication through another transmission path connected through the transmission path switch, and can receive a transmission path current through the transmission path. In this manner, a range of communication trouble due to the accident can be minimized.

If a switch function for cutting off a transmission path current to a transmission path at the downstream side of a transmission path switch is used, another transmission path switch provided at the downstream side of the transmission path switch is operated as described above. As a result, a transmission path portion between the transmission path switches can be separated from the information communication network. Therefore, by utilizing this function, an information communication path portion including a terminal device which generates a disturbance signal can be cut off, and a communication trouble caused by the disturbance can be effectively prevented from affecting the entire system. More specifically, meshed information transmission paths are appropriately switched through the transmission path switches, thus eliminating the various problems of the prior arts.

DETAILED DESCRIPTION OF THE PREFERRED EMBODIMENTS

Figure 1:
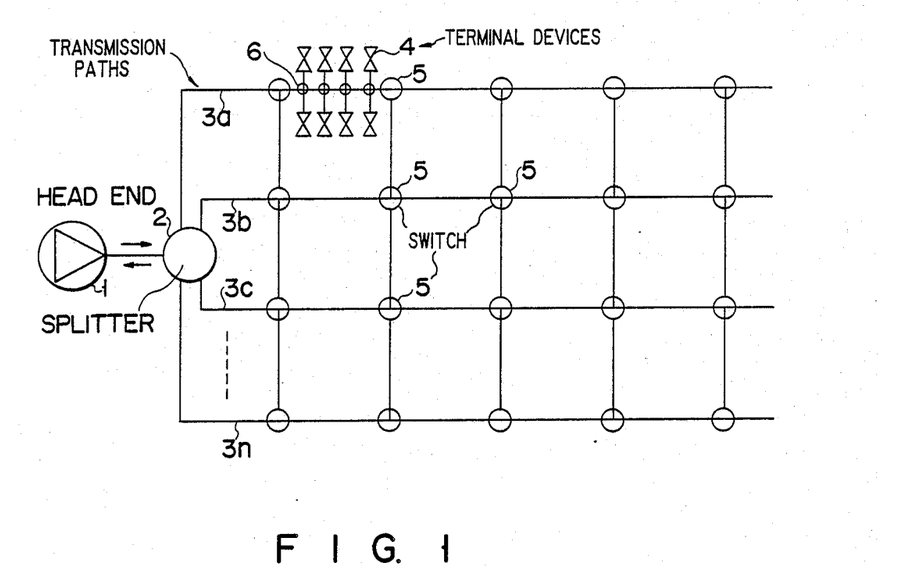
FIG. 1 is a view showing the overall arrangement of a frequency-division multiplex broadband multimedia network according to an embodiment of the present invention.

FIG. 1 is a view showing the overall arrangement of a frequency-division multiplex broadband multimedia network according to the present invention. In the network of the present invention, transmission path switches are provided at respective lattice points of a plurality of information transmission paths which are arranged in a matrix. Upon switching of these transmission path switches, a plurality of tree network systems are formed.

In the network shown in FIG. 1, head end 1 is connected to splitter 2.

A plurality of tree transmission paths 3a, 3b, ... 3n are connected to splitter 2. These transmission paths 3a, 3b, ... 3n are laid out to be parallel to roads in a matrix. Transmission paths 3a, 3b, ... 3n are connected to terminal devices 4 through tap-offs.

Figure 2:
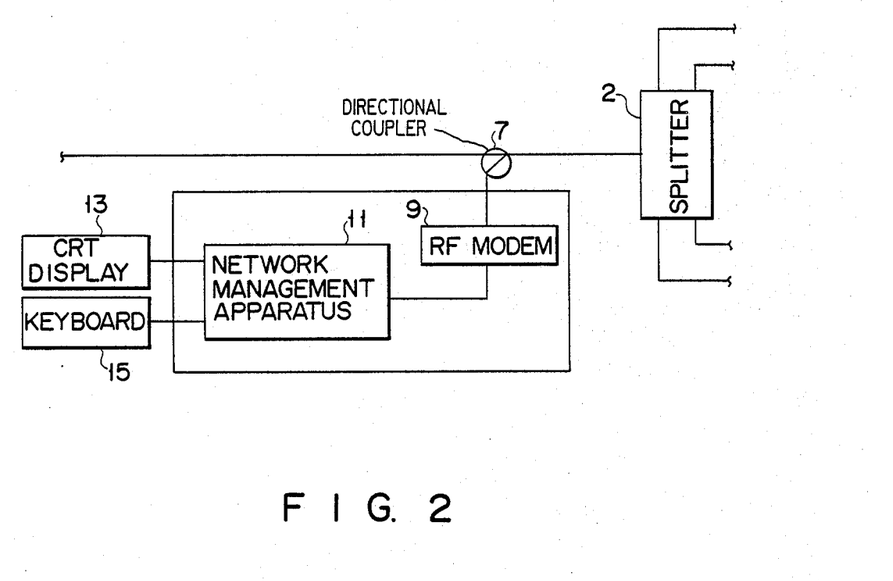
FIG. 2 is a detailed block diagram of a head end in FIG. 1.

Transmission path switches 5 are provided at respective lattice points of the plurality of transmission paths 3a, 3b, ... 3n. Head end 1 receives broadcast signals from broadcasting stations with high fidelity, and retransmits them to subscribers. In addition, head end 1 comprises private broadcasting equipment, and transmits various private programs to subscribers. For example, head end 1 is connected to RF modem 9 through directional coupler 7, as shown in FIG. 2. Furthermore, head end 1 is connected to network management apparatus 11 through RF modem 9. Apparatus 11 is also connected to CRT display 13 and keyboard 15. Apparatus 11 manages the entire network. When apparatus 11 detects an abnormality, it causes display 13 to display the abnormal position.

Each transmission path switch 5 serves to transmit a downstream signal toward a downstream side or to transmit a signal from an adjacent transmission path to the other adjacent transmission path.

Figure 3:
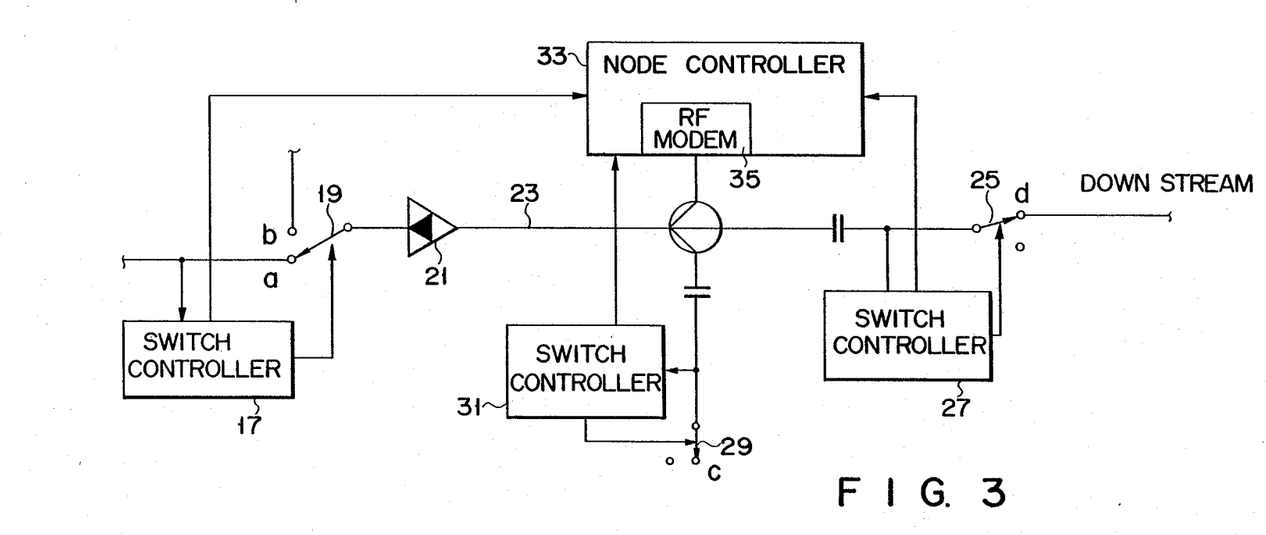
FIG. 3 is a detailed block diagram of a transmission path switch in FIG. 1.

FIG. 3 is a detailed block diagram of transmission path switch 5. In FIG. 3, a terminal a side corresponds to an upstream signal flow, and a terminal d side corresponds to a downstream signal flow. An upstream signal is input to first switch controller 17. Controller 17 checks a transmission path current. If a predetermined threshold level is detected, controller 17 connects switch 19 to terminal a. On the other hand, if supply of the transmission path current is interrupted, controller 17 determines that some abnormality (e.g., disconnection of transmission path) occurs on the transmission path, and connects switch 19 to terminal b. More specifically, when transmission path 23 is in a normal state, controller 17 connects switch 19 to terminal a so as to flow the upstream signal toward the downstream side. If some abnormality occurs on the transmission path, controller 17 connects switch 17 to terminal b so that a signal can be transmitted through an adjacent transmission path. In order to compensate for signal attenuation, transmission path 23 is connected to bidirectional amplifier 21. In addition, path 23 is connected to second switch controller 27 for controlling disconnection/connection of switch 25 provided at downstream terminal d. When a malfunction occurs at the downstream side, second switch controller 27 cuts off switch 25 to separate the downstream transmission path. Furthermore, third switch controller 31 controls disconnection/connection of third switch 29 at terminal c. Information indicating disconnection/connection of switches 19, 25, and 29 from first to third switch controllers 17, 27, and 31 is supplied to node controller 33. Node controller 33 has RF modem 35, and can communicate with head end 1 as a host apparatus shown in FIG. 2. Therefore, information from the node controllers of the transmission path switches are supplied to network management apparatus 11 of head end 1. When an abnormality occurs, data associated with the abnormality is displayed on CRT display 13. Note that switch 25 can be automatically cut off, but is manually restored. A worker goes to the site of abnormality to remove malicious signal disturbance. After he confirms that the abnormality is removed, the worker transmits a message indicating this to the network management apparatus through node controller 33. The network management apparatus receives the information, and instructs corresponding node controller 33 to restore switch 25. Based on this instruction, the worker connects switch 25. As described above, terminal a is connected to the upstream transmission path, terminal d is connected to the downstream transmission path, and terminals b and c are connected to other adjacent information transmission paths.

Figure 4A:
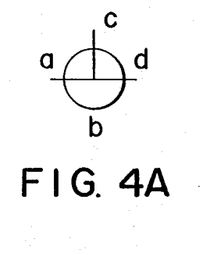
FIGS. 4A through 4D show four modes of the transmission path switch.
Figure 4B:
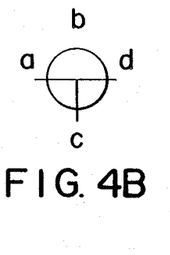
Figure 4C:
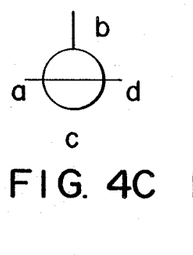
Figure 4D:
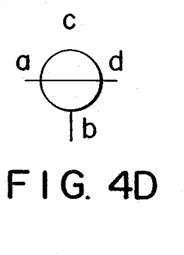

Note that transmission path switch 5 shown in FIG. 1 has four modes shown in FIGS. 4A through 4D. For example, in the transmission path switch shown in FIG. 4A, switch 19 is connected to terminal a, switch 25 is connected to terminal d, and switch 29 is connected to terminal c. The transmission path switch shown in FIG. 4B is the same as that shown in FIG. 4A. However, in FIG. 4A, information flows from one adjacent transmission path, and in FIG. 4B, information flows into the other adjacent transmission path. In the transmission path switch shown in FIG. 4C, switch 19 is connected to terminal a, switch 25 is connected to terminal d, and switch 29 is open. FIG. 4D is the same as FIG. 4C except for an information flow direction.

These transmission path switches 5 are connected to transmission paths 23 in consideration of their directions, so that if an abnormality occurs at any point, information can be supplied from adjacent transmission paths.

Figure 5:
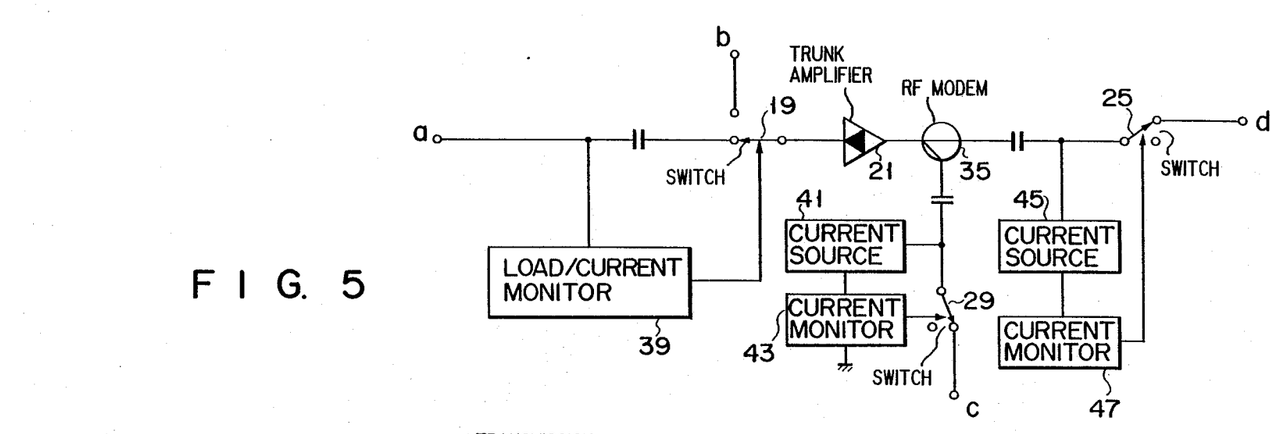
FIG. 5 is a further detailed block diagram of first to third switch controllers in FIG. 3.

FIG. 5 is a further detailed block diagram of first to third switch controllers 17, 27, and 31 shown in FIG. 3. First switch controller 17 comprises load/current monitor 39. Second and third switch controllers 27 respectively comprise current sources 45 and 41 and current monitors 47 and 43. Assume that a disturbance signal is generated at the downstream side of terminal d. Signals generated from all the terminal devices are collected at head end 1. Therefore, if the disturbance signal is sent to head end 1, the overall network fails. For this reason, second switch controller 27 flows a predetermined current from current source 45, and monitors this current value. When controller 27 detects that the current becomes zero, it determines that the downstream transmission path is disconnected. Thus, when a disturbance signal is generated from terminal device 4, switch 25 is cut off, and local disconnection processing of the transmission path is performed in accordance with an instruction from head end 1. When a transmission path current disappears, switch 19 in downstream transmission path switch 5 is connected to terminal b. Therefore, a transmission path portion at the downstream side of switch 25 up to a portion of next transmission path switch 5 is locally disconnected from the network. This processing is sequentially performed for transmission path current cutting switches 25 of a plurality of transmission path switches 5, thereby sequentially and locally separating the transmission paths. In this manner, a transmission path portion where the disturbance signal disappears is detected, thereby quickly detecting the trouble. Note that third switch controller 31 is provided with current source 41 for the same reason as the second switch controller.

Figure 6:
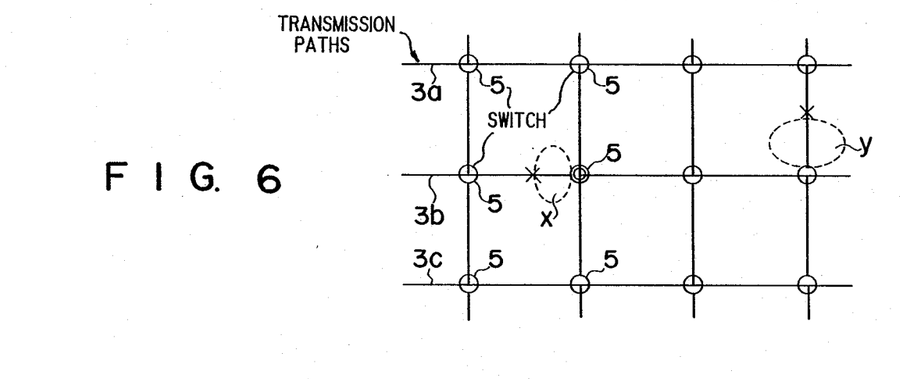
FIG. 6 is a view for explaining the function of the network according to the present invention.

For example, in the frequency-division multiplex broadband multimedia network with the above arrangement of the present invention, if an accident such as a cable fire or disconnection occurs at a point indicated by mark "x" in FIG. 6, supply of the transmission path current from the accident point toward the downstream side is stopped. Then, transmission path switch 5 at the most upstream side of the downstream transmission path portion from the accident point connects switch 19 to terminal b since the transmission path current disappears. Thus, the transmission path portion at the downstream side of the transmission path switch is connected to another adjacent information transmission path through switch 5. As a result, terminal device 4 connected to the transmission path portion at the downstream side of this switch 5 can communicate through another information transmission path 23 from switch 5, and can receive the transmission path current through this path.

Figure 7:
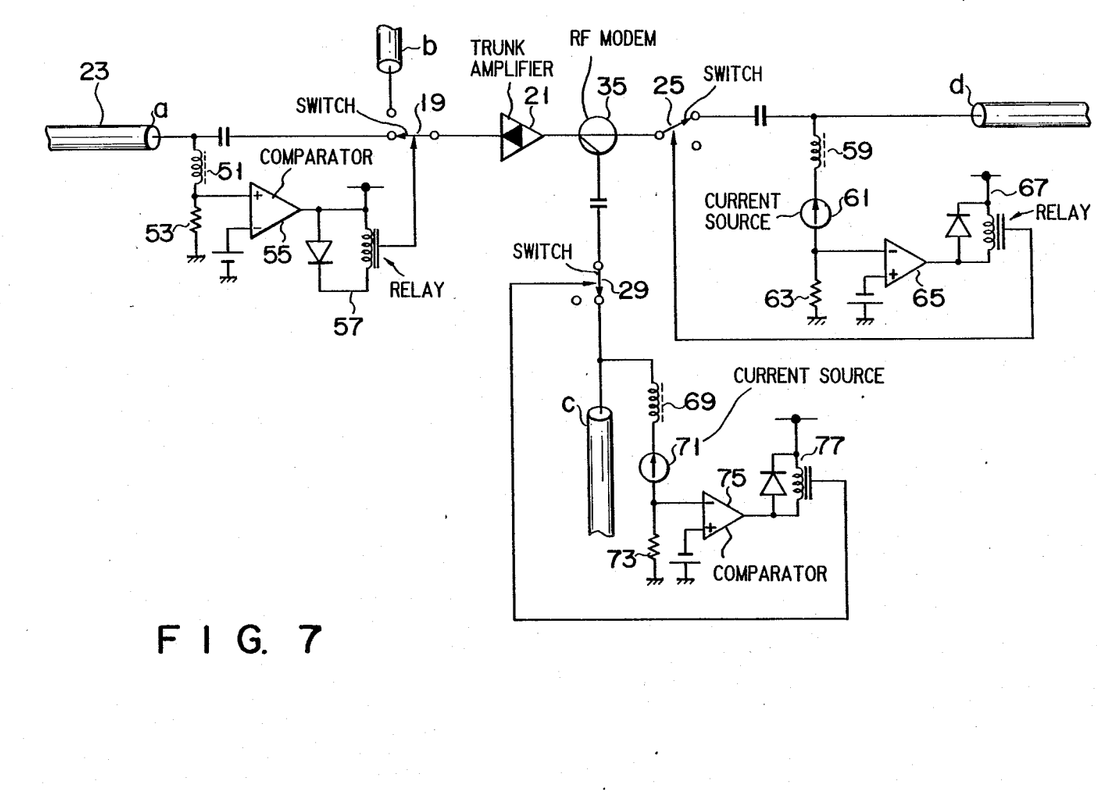
FIG. 7 shows the detailed circuit arrangement of load/current monitor 39, current source 41, current monitor 43, current source 45, and current monitor 47.
Figure 8A:
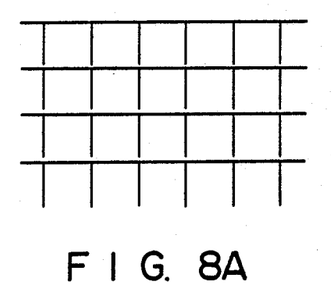
FIG. 8A through 8E show modifications of the network according to the present invention.
Figure 8B:
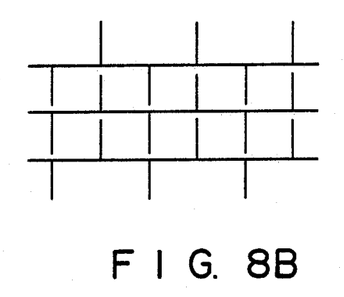
Figure 8C:
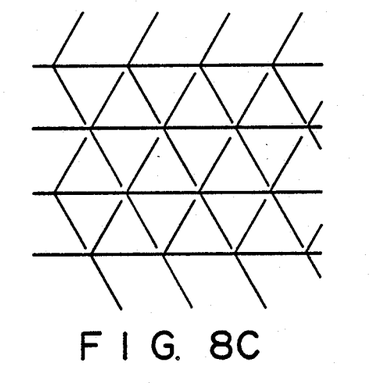
Figure 8D:
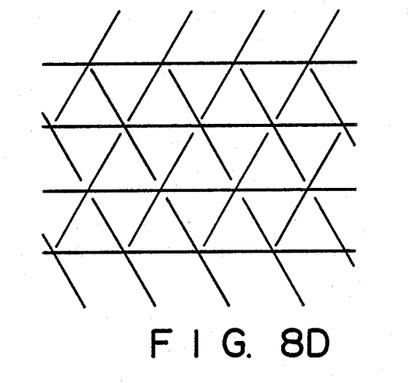
Figure 8E:
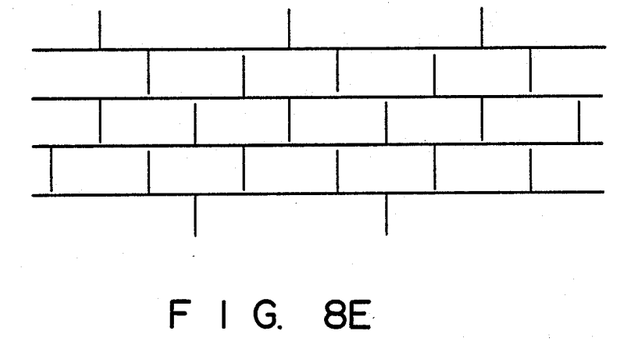

FIG. 7 shows the detailed circuit arrangement of load/current monitor 39, current source 41, current monitor 43, current source 45, and current monitor 47. However, the present invention is not limited to this circuit arrangement, and various other circuit arrangements may be employed. In FIG. 7, only a DC current of a transmission path current supplied from transmission path 23 through terminal a is detected by high-frequency choke 51. A voltage across resistor 53 and a ground terminal is compared with a threshold voltage by voltage comparator 55. If the voltage is higher than the threshold voltage, the output from comparator 55 goes to HIGH level, and it is determined that the controller is connected to the upstream path. On the other hand, if the voltage is lower than the threshold voltage, the output from comparator 55 goes to LOW level, and it is determined that the controller is disconnected from the upstream path. If the controller is connected to the upstream path, the output from comparator 55 goes to HIGH level, and a current flows through relay 57. Relay 57 is kept off in a normal state, and switch 19 is connected to terminal a. If the controller is disconnected from the upstream path, the output voltage from comparator 55 goes to LOW level, and relay 57 is operated to connect switch 19 to terminal b.

Second switch controller 27 comprises high-frequency choke 59, current source 61, resistor 63, voltage comparator 65, and relay 67. When the controller is connected to the downstream path, i.e., when a predetermined current flows from current source 61, an input voltage of voltage comparator 65 becomes lower than a ground level. If the input voltage becomes further lower than a threshold level, the output from comparator 65 goes to HIGH level. Therefore, in this case, relay 67 is not operated. When the controller is disconnected from the downstream path, switch 25 is connected to terminal d, and information sent from the upstream path can flow toward the downstream side.

If the downstream path is disconnected, no current can flow. Therefore, the output from comparator 65 goes to LOW level. Relay 67 is thus operated to open switch 25.

Similarly, third switch controller 31 comprises high-frequency choke 69, current source 71, resistor 73, voltage comparator 75, and relay 77. The operation of controller 31 is the same as second switch controller 27.

The present invention is not limited to the above embodiment. For example, as shown in FIGS. 8A through 8E, various modifications may be made. More specifically, a layout of transmission paths or switching of connections among transmission paths through transmission path switches may be determined in accordance with specifications required for each system. A connection pattern may be modified as shown in FIGS. 8A through 8E. For example, if cable disconnections occur at a plurality of points, a trouble area can be minimized.

Furthermore, trunk amplifier 21 provided to transmission path 23 need not be arranged integrally with transmission path switch 5.

Figure 9:
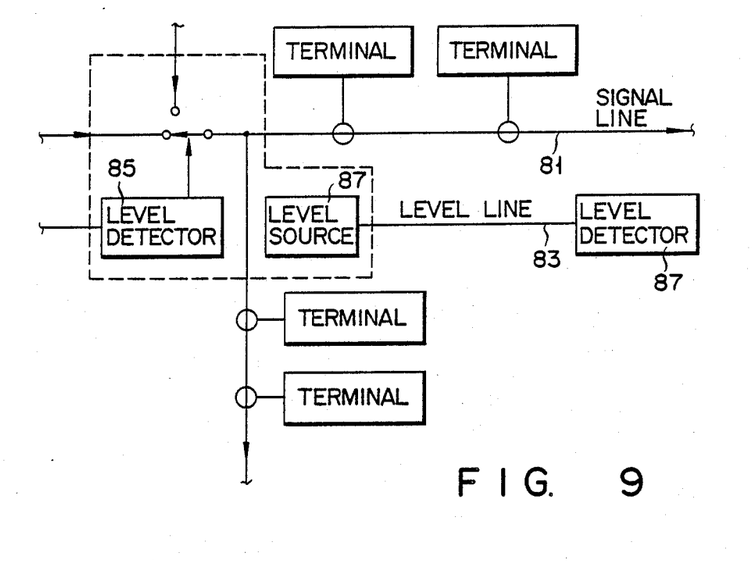
FIGS. 9 through 13 show another embodiment of the transmission path switch in FIG. 1.

FIG. 9 shows another embodiment of the present invention. In the embodiment shown in FIG. 5, the current flowing through transmission path 23 is monitored. When the current value is lower than the predetermined value, it is determined that transmission path is in abnormal state. The present invention is not limited to the above embodiments. In an embodiment shown in FIG. 9, besides signal line 81, a level line 83 is provided to indicate a level of the signal. A level detector 85 and level source 87 are connected to level line 83. Level source may be comprised of a voltage source, a current source of light source. Whether a level of level line 83 is lower than a predetermined value is determined. If it is lower than the predetermined value, then it may be determined that the transmission path is in abnormal state.

FIG. 9 shows a case wherein level detector 85 and level line 87 are connected to the downstream line. However, as shown in FIG. 10, level detector 85 and level source 87 may be provided in each of the upstream line and the downstream line.

Figure 10:
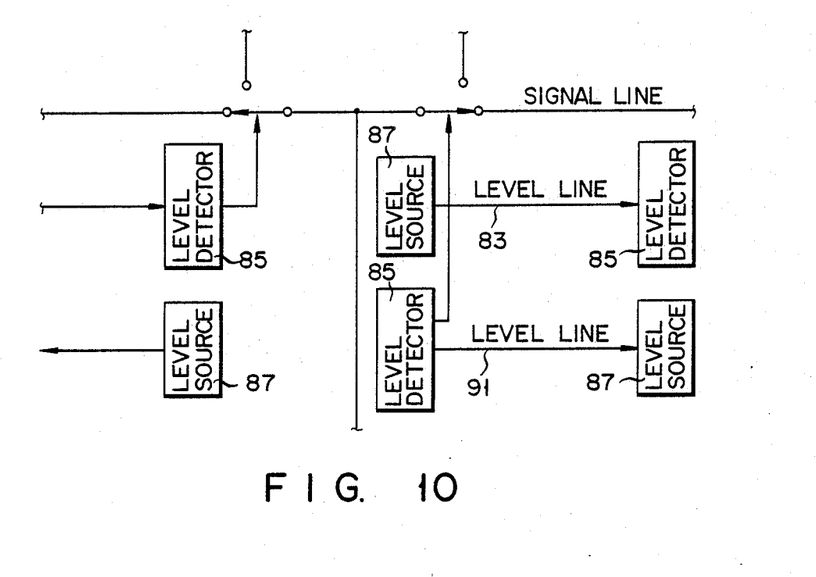
Figure 11:
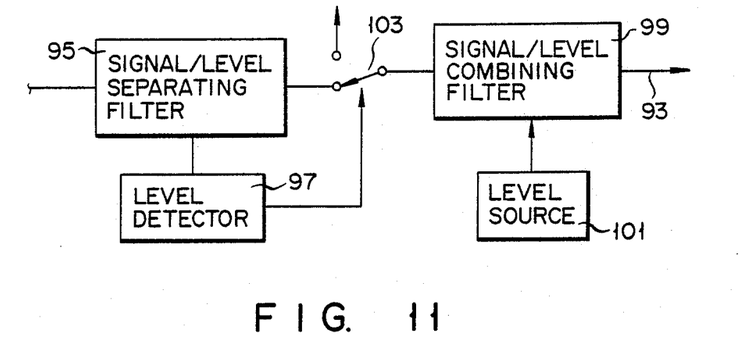

In the embodiments shown in FIGS. 9 and 10, the signal line and the level line are independently provided. However, these lines may comprise a same line as shown in FIGS. 11 through 13.

This can be achieved by frequency-multiplexing the signal and the level and transmitting through a same line. In the embodiment shown in FIG. 11, a signal/level separating filter 95 is connected to transmission line 93. A level separated by signal/level separating filter 95 is determined to be lower than a predetermined value or not, by level detector 97. If it is lower than the predetermined value, it is determined that the transmission path is in abnormal state. Then, switch 103 is switched, and the signal supplied from the switched transmission path and the level from level source 101 are combined by level combining filter 99. Thus, the combined signal can be transmitted to downstream transmission line.

Figure 12:
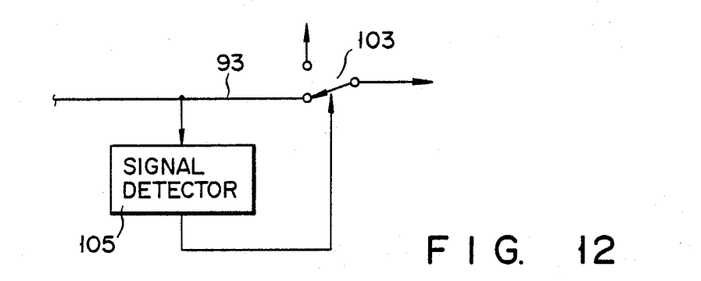

In the embodiment shown in FIG. 12, signal detector 103 detects that signal flowing continuously or intermittently cannot be received for a predetermined time.

Figure 13:
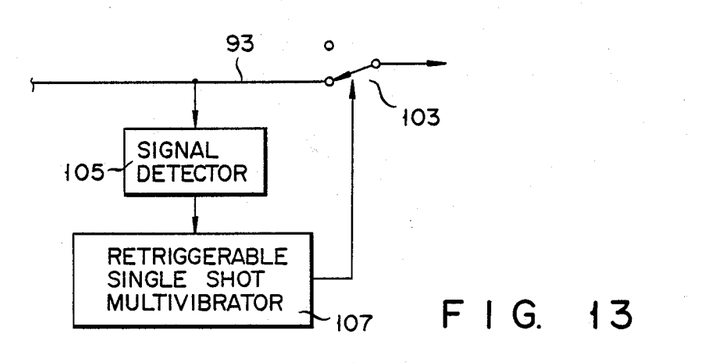

Furthermore, in the embodiment shown in FIG. 13. retriggerable single shot multivibrator 107 is connected to signal detector 105. The output from multivibrator 107 is used as switch changeover signal so that erroneous operation of switch 103 can be assured.

In the embodiments shown in FIGS. 12 and 13, further signal detector 103 is located from signal source (head end 1), the longer predetermined time is set in signal detector 103.

What is claimed is:

1. An information communication network comprising:
    a head end;
    a plurality of information transmission paths coupled through said head end;
    a plurality of terminal devices respectively connected to said plurality of information transmission paths;
    transmission path switches, at least one transmission path switch being connected to each of said plurality of information transmission paths, and switching between one transmission path corresponding thereto and another information transmission path;

wherein said network has a tree topology wherein a head end side corresponds to an upstream side and a terminal device side corresponds to a downstream side, and each of said transmission path switches comprises transmission path monitor means for monitoring one of said information transmission paths, and, when its transmission path is in an abnormal operating state, outputting a detection signal indicating so;

switch means, responsive to the detection signals from said transmission path monitor means, for connecting a portion of the corresponding information transmission path downstream of the corresponding transmission path switch to another information transmission path;

a current source for supplying a current to the downstream side of the information transmission path;

current value detection means for monitoring a current value from said current source, and outputting a detection signal upon detecting that the current value is below a predetermined value; and second switch means, responsive to the detection signal from said current value detection means, for disconnecting the downstream portion of the information transmission path.

2. A network according to claim 1, wherein said plurality of information transmission paths are arranged parallel to each other at predetermined intervals, and said transmission path switches are located at a plurality of points of each of said information transmission paths.

3. A network according to claim 1, wherein said plurality of information transmission paths are laid out in a matrix, and said transmission path switches are located at lattice points of said matrix.

4. A network according to claim 1, wherein switching of said information transmission paths is performed when an accident occurs on said information transmission path, and the transmission path switch located at the most upstream position of a transmission path portion at the downstream side of the accident point performs the switching of the transmission paths.

5. A network according to claim 1, wherein said second switch means disconnects the information transmission path portion to which the terminal device generating a disturbance signal is connected.

6. A network according to claim 1, further comprising:

a second current source for supplying a current an information transmission path adjacent to said information transmission path;

second current value detection means for monitoring a current value from said second current source and outputting a detection signal upon detecting that the current value is below a predetermined value; and third switch means, responsive to the detection signal from said second current value detection means, for disconnecting the adjacent information transmission path.

7. A network according to claim 6, further comprising a node controller for transmitting, to said head end, information indicating connection/ disconnection of said first through third switch means.

8. A network according to claim 1, wherein said network is a frequency-division multiplex broadband multimedia network.

9. An information communication network, comprising:

a head end for transmitting information;

a plurality of first unidirectional transmission lines connected to said head end;

a second unidirectional transmission line for connecting one of said first unidirectional transmission lines to another of said first unidirectional transmission lines;

a plurality of terminal devices respectively connected to said plurality of first unidirectional transmission lines;

switching means for connecting said one of said unidirectional transmission lines to one end of said second unidirectional transmission line, and said another of said first unidirectional transmission lines to the other end of said second unidirectional transmission line;

a level source supplying means for supplying a predetermined level signal to the downstream side of said first unidirectional transmission line; and level value detecting means for monitoring a value of a predetermined level signal from said level source supplying means, and outputting a detection signal upon detecting that a level of a predetermined level signal is below a predetermined value.

10. An information communication network, comprising:

a head end for transmitting information;

a tree-like unidirectional transmission line rooted to said head end;

a plurality of terminal devices coupled to said tree-like unidirectional transmission line, for transmitting information to said head end through said tree-like unidirectional transmission line;

switching means for connecting the end point of said tree-like unidirectional transmission line to a transmission line other than the transmission line connecting between the end point and said head end;

a level source supplying means for supplying a predetermined level signal to the downstream side of the tree-like unidirectional transmission line; and level value detecting means for monitoring a value of a predetermined level signal from said level source supplying means, and outputting a detection signal upon detecting that a level of a predetermined level signal is below a predetermined value.

11. An information communication network according to claim 10, wherein said switching means is rendered conductive when said detecting means detects that the predetermined level signal is below a predetermined value.

* * * * *